(12) United States Patent
Mo et al.

(10) Patent No.: US 8,049,834 B2
(45) Date of Patent: Nov. 1, 2011

(54) DISPLAY DEVICE AND BACKLIGHT MODULE WITH THERMAL ISOLATING LAYER

(75) Inventors: Yao-An Mo, Hsin-Chu (TW);
Chieh-Jen Cheng, Hsin-Chu (TW);
Hsin-An Chang, Hsin-Chu (TW);
Chia-Hun Cheng, Hsin-Chu (TW);
Hung-Chuo Lee, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 217 days.

(21) Appl. No.: 12/619,897

(22) Filed: Nov. 17, 2009

(65) Prior Publication Data
US 2010/0245716 A1    Sep. 30, 2010

(30) Foreign Application Priority Data

Mar. 24, 2009   (TW) ................................ 98109557 A

(51) Int. Cl.
*G02F 1/1333*   (2006.01)
(52) U.S. Cl. .............................. 349/58; 349/65; 362/633
(58) Field of Classification Search .................... 349/65, 349/615, 632, 633
See application file for complete search history.

(56) References Cited

U.S. PATENT DOCUMENTS 7,083,318 B2 *   8/2006   Ha et al. ......................... 362/633

FOREIGN PATENT DOCUMENTS

| TW | M271171 | 2/1994 |
| TW | M283201 | 5/1994 |
| TW | 200807080 | 7/1995 |
| TW | 97111642 | 3/1997 |
| TW | M350035 | 7/1997 |

* cited by examiner

*Primary Examiner* — Richard Kim
(74) *Attorney, Agent, or Firm* — Thomas, Kayden, Horstemeyer & Risley, LLP

(57) ABSTRACT

A display device and a backlight module thereof are provided. The display device further includes a display panel having a display area. The backlight module is disposed under the display panel and includes a light source holder, a light source, and a light guide plate. The light source holder has a sidewall, a top plate, and a bottom plate, wherein the bottom plate partially overlaps the display area of the display device. The light guide plate is disposed corresponding to the display area of the display device and has one end located in an opening between the top plate and the bottom plate. A thermal isolating layer is interposed between the light guide plate and a portion of the bottom plate which corresponds to the display area. The perpendicular distance between the light guide plate and the portion of the bottom plate overlapping the thermal isolating layer is greater than a perpendicular distance between the light guide plate and the other portion of the bottom plate.

24 Claims, 5 Drawing Sheets

DISPLAY DEVICE AND BACKLIGHT MODULE WITH THERMAL ISOLATING LAYER

This application claims the priority based on a Taiwanese Patent Application No. 098109557, filed on Mar. 24, 2009, the disclosure of which is incorporated herein by reference in its entirety.

BACKGROUND OF THE INVENTION

1. Field of the Invention

The present invention relates to a backlight module and a display device having the same, and more particularly, to a backlight module with a thermal isolating layer and a display device having the same.

2. Description of the Prior Art

The demand for liquid crystal display (LCD) significantly increases due to advantages of thinner thickness, lighter weight, portability, and low radiation in comparison with the CRT display. One of the main components of the liquid crystal display is the backlight module. With the progress of LCD manufacture technology, the backlight module is developed to be thinner thickness, higher brightness, and lower cost. In order to maintain the competition ability of LCD in the future market, lots of efforts spend on developing or designing a backlight module of better performance.

FIG. 1 illustrates a conventional liquid crystal display device and a backlight module thereof. As shown in FIG. 1, the LCD panel 10 is disposed over the backlight module 30 and a frame 15 surrounds the display panel 10. For an edge-type backlight module, the backlight module 30 includes a holder 31, a light bar 32, and a light guide plate 33. The holder 31 includes a sidewall 51, a top plate 53, and a bottom plate 55. The top plate 53 and the bottom plate 55 respectively extend from the upper end and the lower end of the sidewall 51 to form a space. The light bar 32 consists of a printed circuit board and light emitting diodes. As shown in FIG. 1, the light bar 32 is positioned in the space defined by the holder 31. One end of the light guide plate 33 extends and is clamped between the top plate 53 and the bottom plate 55 of the holder 31. Light emitted from the light bar 32 can enter the light guide plate 33 through this end.

In the case of using the light bar 32 as the light source, the heat dissipation effect significantly affects the lifetime of the light emitting diodes. In order to improve the heat dissipation of the light emitting diode, in the design of FIG. 1, the length of the bottom plate 55 of the holder 31 is increased along the light guide plate 33. By increasing the area of the bottom plate 55, the heat dissipation effect of the bottom plate 55 is enhanced. However, in such a design, since the bottom plate 55 extends into the projection range of the display area 11 of the display panel 10, the heat is conducted to the display area 11 of the display panel 10 through the light guide plate 33 during heat dissipation by the bottom plate 55. Liquid crystal molecules are injected into the display area 11 of the display panel 10. When the liquid crystal molecules are influenced by the heat dissipated from the bottom plate 55, resulting in incomplete twist. Such incomplete twist causes leakage of light when the display area 11 is at dark state, and therefore inadvertently affects the overall performance of the liquid crystal display device.

SUMMARY OF THE INVENTION

An object of the present invention is to provide a backlight module and a display device having the backlight module to reduce the leakage of light in the display area.

Another object of the present invention is to provide a backlight module and a display device having the backlight module to prevent the incomplete twist of liquid crystal molecules in the display area.

Another object of the present invention is to provide a backlight module and a display device having the backlight module to prolong the lifetime of the light source.

The display device includes a display panel and a backlight module, wherein the display panel has a display area. The backlight module is disposed under the display panel and configured to emit light into the display panel to provide the light source required for displaying image on the display area. The backlight module includes a light source holder, a light source, and a light guide plate. The light source holder includes a sidewall, a top plate, and a bottom plate. The top plate and the bottom plate respectively extend from an upper end and a lower end of the sidewall and together form a semi-opened space for accommodating the light source. When assembled with the display panel, the bottom plate at least partially overlaps the display area of the display panel.

The light guide plate is disposed corresponding to the display area of the display panel, wherein one end of the light guide plate extends into the opening of the space and is clamped by the top plate and the bottom plate. The end of the light guide plate extending into the opening corresponds to the light source and is configured to receive light generated from the light source. A thermal isolating layer is interposed between the light guide plate and a portion of the bottom plate that overlaps the display area. The thermal isolating layer at least partially overlaps the display area of the display panel, i.e. extends into the vertical projection range of the display area. If the bottom plate is divided into two portions according to overlapping or not overlapping the thermal isolating layer, a perpendicular distance between the light guide plate and a portion of the bottom plate overlapping the thermal isolating layer is greater than a perpendicular distance between the light guide plate and the portion of the bottom plate not overlapping the thermal isolating layer.

DETAILED DESCRIPTION OF THE PREFERRED EMBODIMENT

The present invention provides a backlight module and a display device having the backlight module. The backlight module is disposed in the display device to provide the necessary light source for producing images. The display device preferably includes a liquid crystal display device, such as liquid crystal display televisions, liquid crystal display monitors of personal computers and laptop computers, and liquid crystal display screens of mobile phones and digital cameras.

Figure 1:
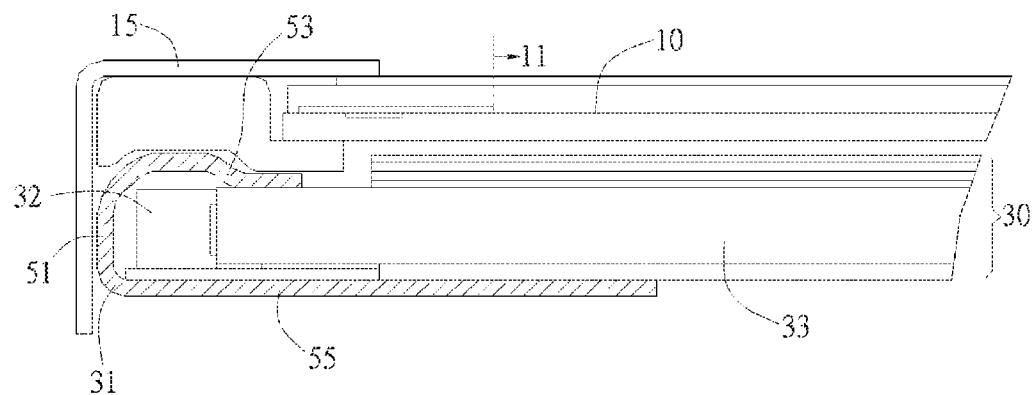
FIG. 1 illustrates a schematic cross-sectional view of a conventional liquid crystal display device.
Figure 2:
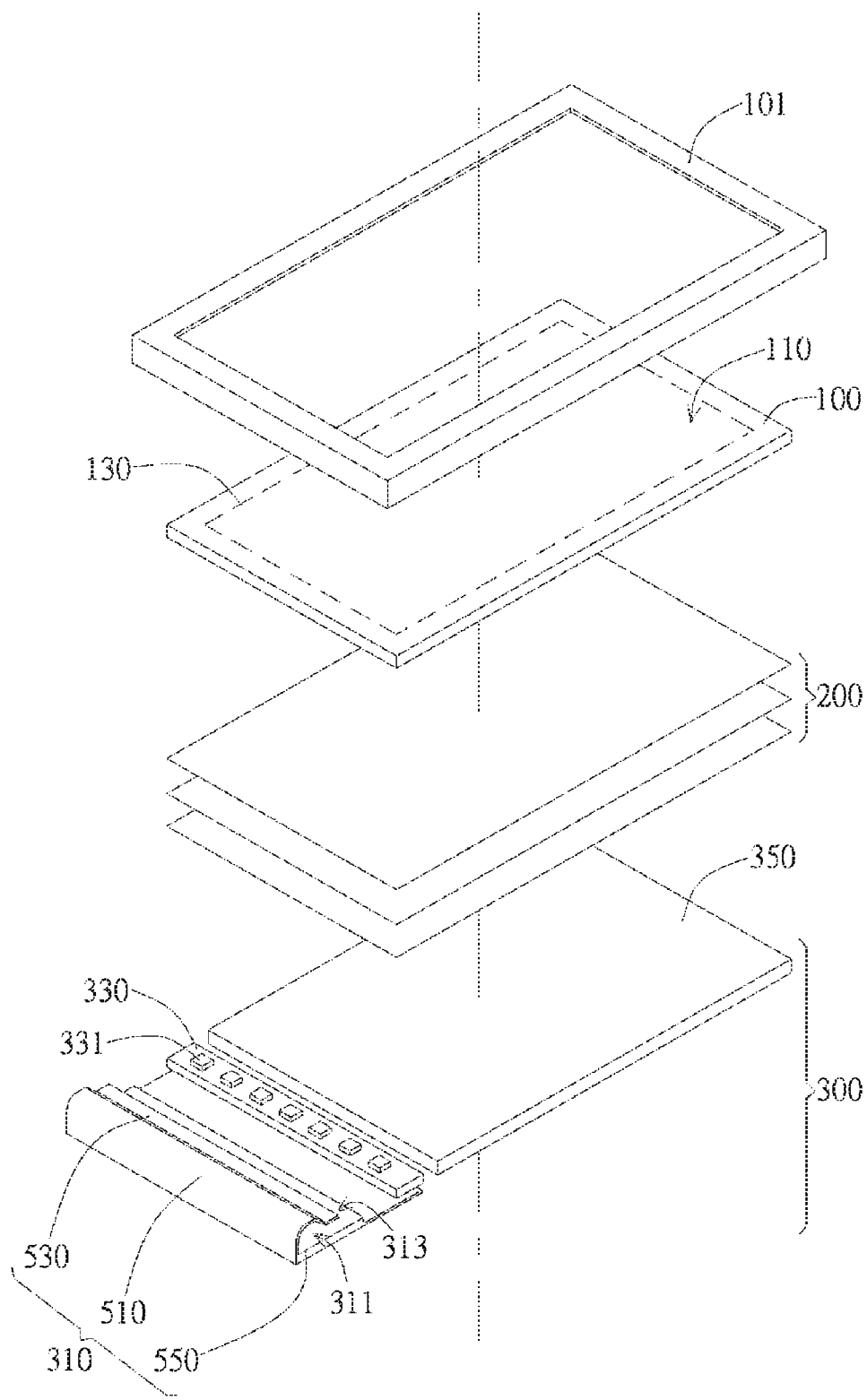
FIG. 2 illustrates an exploded view of a display device and a backlight module in accordance with one embodiment of the present invention.

As shown in FIG. 2, the display device includes a display panel 100 and a backlight module 300. The display panel 100 is preferably a liquid crystal display panel and has a display area 110. In a preferred embodiment, the display area 110 is the image displayable portion of the display panel 100, i.e. the area where the liquid crystal molecules are disposed, which is surrounded by the side frame 130. By adjusting the voltage to control rotations of the liquid crystal molecules, the brightness of each pixel can be altered to produce images. The display panel 100 is covered by an outer frame 101 to protect and position the display panel 100 and the underlying backlight module 300.

Figure 3:
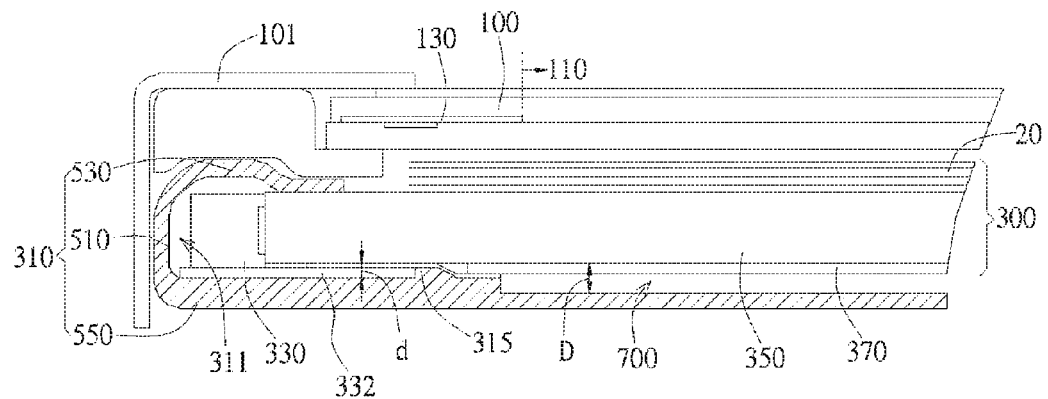
FIG. 3 is a schematic cross-sectional view of an embodiment of the display device and the backlight module.

The backlight module 300 is disposed under the display panel 100. Light generated by the backlight module 300 enters into the display panel 100 to provide the display area 110 with the necessary light source for producing images. If required, the backlight module 300 can have optical films 200 such as diffusion sheet and bright enhancement film. As shown in FIG. 2 and FIG. 3, in the case of an edge-type backlight module, the backlight module 300 includes a light source holder 310, a light source 330, and a light guide plate 350. The light source holder 310 is preferably formed by bending a metal plate; however, in different embodiments, the light source holder 310 can be made of plastics by an injection molding process. As shown in FIG. 2, the light source holder 310 is preferably formed as a long strip structure, wherein one end of the long strip structure is rolled back along the lengthwise direction to form a structure with an approximate U-shaped cross section, as shown in FIG. 3. With such a structure, the light source holder 310 has a space 311, which is defined by the inner surface of the rolled-back portion of the long strip structure. The space 311 is a semi-opened space and distributed along the widthwise direction of the light source holder 310.

As shown in FIG. 2 and FIG. 3, the light source holder 310 includes a sidewall 510, a top plate 530, and a bottom plate 550. The sidewall 510, the top plate 530, and the bottom plate 550 all extend along the widthwise direction. The top plate 530 and the bottom plate 550 respectively extend from an upper end and a lower end of the sidewall 510 towards the opening 313 of the space 311. In a preferred embodiment, two ends of the light source holder 310 are bent towards a same direction to form the top plate 530 and the bottom plate 550, while the unbend portion between the top plate 530 and the bottom plate 550 is the sidewall 510. The sidewall 510, the top plate 530, and the bottom plate 550 together form the semi-opened space 311, and the area between an edge of the top plate 530 and the bottom plate 550 is the opening 313 to the space 311. Furthermore, as shown in FIG. 3, the bottom plate 550 preferably has a length longer than that of the top plate 530. When the display panel 100 is assembled, the bottom plate 550 has a potion overlapping the display area 110 of the display panel 100. Herein, "overlapping" means the portion of the bottom plate 550 extends into the vertical projection range of the display area 110. Within the vertical projection range, the bottom plate 550 and the display area 110 have a spatial-stack relationship.

As shown in FIG. 2 and FIG. 3, the light source 330 is accommodated in the space 311 and extends along the widthwise direction of the space 311. The light source 330 emits light towards the opening 313 of the space 311. In this embodiment, the light source 330 is a light bar consisting of light emitting diodes 331 and a long strip substrate 332. The light emitting diodes 331 are distributed along the widthwise direction of the space 311, i.e. arranged in a line along the opening 313. However, in different embodiments, the light source 330 can be a tube lamp disposed along the widthwise direction of the space 311. As shown in FIG. 3, the inner side of the bottom plate 550 can be designed to have a protrusion 315 protruding towards the light guide plate 350. In one embodiment, the protrusion 315 can be designed to correspond to and touch against the side edge of the long strip substrate 332 of the light source 330, so as to position the light source 330 in the space 313.

In the embodiment of FIG. 2 and FIG. 3, the light guide plate 350 is disposed corresponding to the display area 110 of the display panel 100. That is, the light guide plate 350 has at least a portion within the vertical projection range of the display area 110. As shown in FIG. 3, the light guide plate 350, the display panel 100, and the bottom plate 550 all extend towards a same direction and are substantially parallel to one another, wherein the light guide plate 350 is disposed between the display panel 100 and the bottom plate 550. One end of the light guide plate 350 is located in the opening 313 of the light source holder 310 and clamped by the top plate 530 and the bottom plate 550. The end of the light guide plate 350 extending into the opening 313 corresponds to the light source 330 and receives light from the light source 330 into the light guide plate 350 for light transmission. Moreover, as shown in FIG. 3, the protrusion 315 protrudes from the inner surface of the bottom plate 550 towards the light guide plate 350. For example, in one design option, the protrusion 315 touches against the light plate 350 to provide support to the light guide plate 350.

Figure 4:
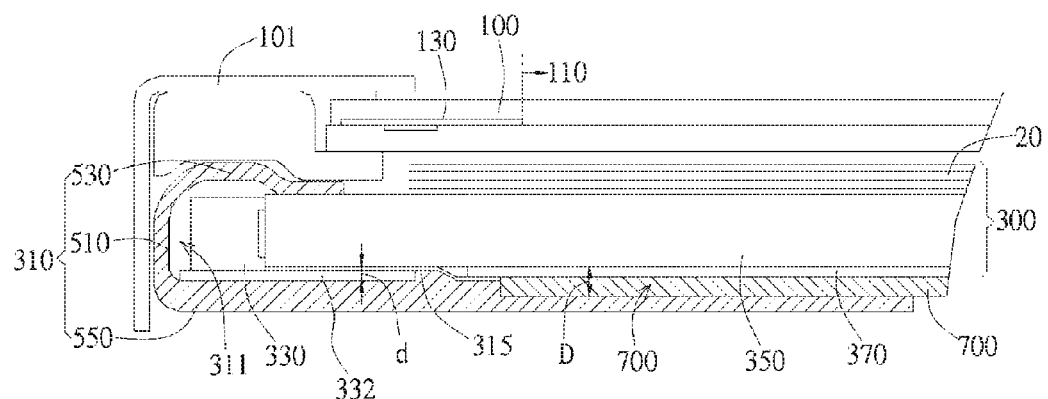
FIG. 4 is a schematic cross-sectional view of an embodiment of a thermal isolating layer.

As shown in FIG. 3, a thermal isolating layer 700 is disposed between a portion of the bottom plate 550 that overlaps the display area 110 and the light guide plate 350. In this embodiment, the thermal isolating layer 700, the light guide plate 350, the display panel 100, and the bottom plate 550 extend in the same direction and are parallel to one another. Moreover, the thermal isolating layer 700 at least partially overlaps the display area 110 of the display panel 100. That is, the thermal isolating layer 700 extends into the vertical projection range of the display area 110. The thermal isolating layer 700 preferably corresponds to the edge of the display area 110 to enhance the thermal isolation effect for the liquid crystal molecules in this area. In the embodiment of FIG. 3, the thermal isolating layer 700 is a layer of air; however, in different embodiments, as shown in FIG. 4, the thermal isolating layer 700 is a layer of thermal isolating material, such as plastics or coatings as appropriate. The thermal isolating layer 700 can be a combination of materials, such as mixing or stacking two different thermal isolating materials or the combination of thermal isolating material and air.

Furthermore, as shown in FIG. 3 and FIG. 4, if the bottom plate 550 is divided into two portions, one overlapping the thermal isolating layer 700 and the other one not overlapping the thermal isolating layer 700, a perpendicular distance D between the portion that overlaps the thermal isolating layer 700 and the light guide plate 350 is larger than a perpendicular distance d between the portion that does not overlap the thermal isolating layer 700 and the light guide plate 350. The difference in distance can be achieved by various manners including, for example, bending the bottom plate 550 to form a step, raising the portion of the bottom plate 550 that does not overlap the thermal isolating layer 700, or increasing the thickness of the portion of the bottom plate 550 that does not overlap the thermal isolating layer 700. The design of longer bottom plate 500 effectively facilitates heat dissipation of the light source 330 and in turn increases the lifetime of the light source 330. The disposition of the thermal isolating layer 700 can mitigate the thermal effect on the liquid crystal molecules in the display panel 100 during the heat dissipation by the bottom plate 550, and accordingly, the occurrence of incomplete twist of the liquid crystal molecules caused by heat can be reduced.

In the embodiments of FIG. 3 and FIG. 4, a reflective sheet 370 is preferably disposed under the light guide plate 350. In these embodiments, the thermal isolating layer 700 is disposed between the reflective sheet 370 and the bottom plate 550. As shown in FIG. 3, the bottom plate 550 supports the bottom surface of the reflective sheet 370 to provide the light guide plate 350 with a supporting effect. However, in different embodiments, the bottom plate 550 can directly support the bottom surface of the light guide plate 350. Furthermore, the bottom plate 550 supports the light guide plate 350 in a position preferably outside the corresponding display area 110 so that the thermal isolating layer 700 can extend outside the projection range of the display are a 110.

Figure 5A:
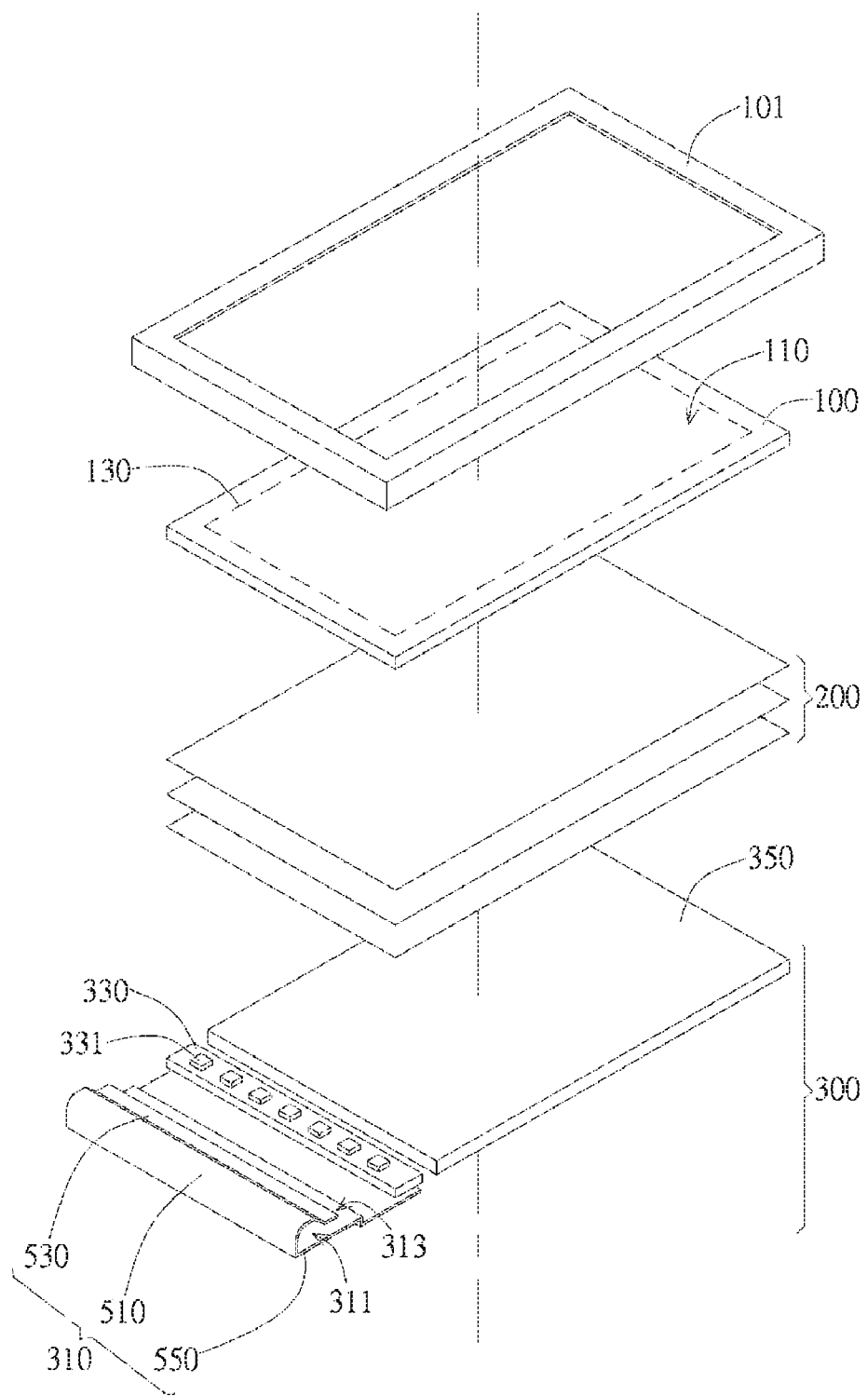
FIG. 5A illustrates an exploded view of a display device and a backlight module in accordance with another embodiment of the present invention.
Figure 5B:
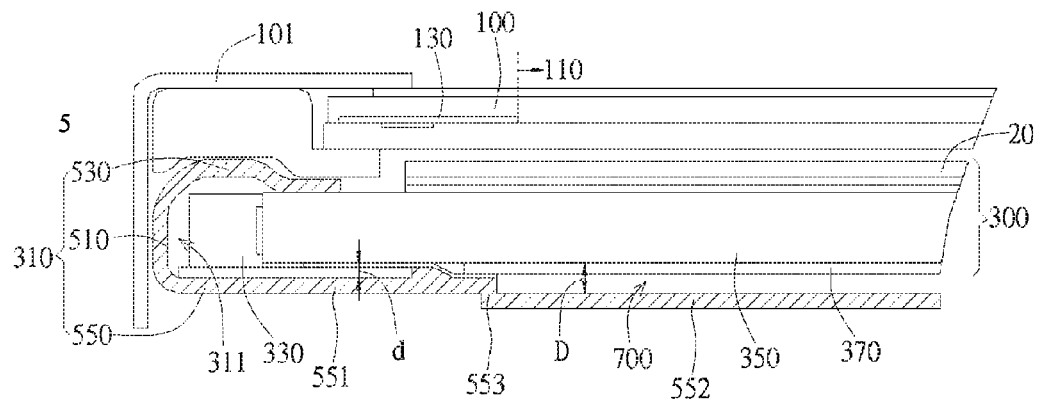
FIG. 5B is a schematic cross-sectional view of the embodiment of FIG. 5A.

In the embodiment of FIG. 5A and FIG. 5B, the bottom plate 550 can be divided into a first tier bottom plate 551 and a second tier bottom plate 552. The first tier bottom plate 551 extends from the lower end of the sidewall 510 and is preferably parallel to the light guide plate 350. The first tier bottom plate 551 preferably provides the support to the bottom surface of the light guide plate 350. As shown in FIG. 5B, when the first tier bottom plate 551 extends approximate to the projection range of the display area 110, the first tier bottom plate 551 is bent away from the light guide plate 350 to form a step 553 and then bent back to the original extending direction to form the second tier bottom plate 552, so that the bottom plate 550 is formed to have a step structure. In a preferred embodiment, the second tier bottom plate 552 extends from the step 553 along the light guide plate 350 by a length greater than 20 mm to provide sufficient heat dissipation effect.

Due to the formation of the step 553, the thermal isolating layer 700 can be disposed between the second tier bottom plate 552 and the light guide plate 350. In a preferred embodiment, the step 553 has a height greater than 0.3 mm, and the corresponding thickness of the thermal isolating layer 700 is also greater than 0.3 mm to provide a better thermal isolation. Moreover, the second tier bottom plate 552 at least partially overlaps the display area 110 to ensure that the thermal isolating layer 700 sandwiched between the second tier bottom plate 552 and the light guide plate 350 also extends into the range of the display area 110.

Figure 6:
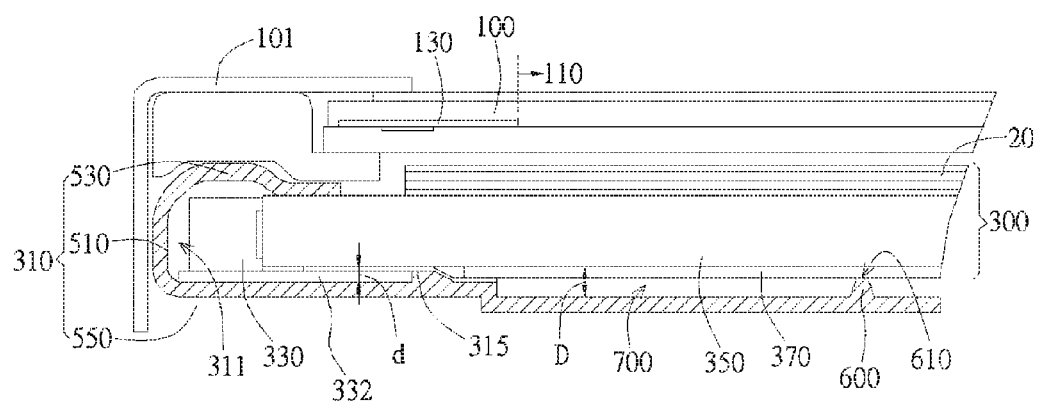
FIG. 6 is a schematic cross-sectional view of an embodiment of the light source holder with a support protrusion.

In the embodiment of FIG. 6, the second tier bottom plate 552 has a support protrusion 600 formed thereon. The support protrusion 600 can be disposed by dinting the second tier bottom plate 552 from the back side, bending the second tier bottom plate 552, or adding additional support to the second tier bottom plate 552. If the bottom plate 550 is made of plastics, the support protrusion 600 can be formed by the injection molding process. As shown in FIG. 6, the support protrusion 600 protrudes towards the light guide plate 350 and supports the light guide plate 350. In a preferred embodiment, the top face 610 of the support protrusion 600 has a width less than 2 mm. Moreover, in this embodiment, when the reflective sheet 370 is disposed under the light guide plate 350, the support protrusion 600 provides the support to the light guide plate 350 through the reflective sheet 370.

The present invention has been described through the relevant embodiments above; however, the embodiments above are only exemplary. What needs to point out is that the embodiments disclosed are not intended to limit the scope of the present invention. Contrarily, the modifications and the equivalents included in the spirit and scope of the claims are all included in the scope of this invention.

What is claimed is:

1. A backlight module for use with a display panel having a display area, the backlight module comprising:
   a light source holder, comprising:
      a sidewall;
      a top plate and a bottom plate respectively extending from an upper end and a lower end of the sidewall, the bottom plate at least partially overlapping the display area, wherein the top plate, the sidewall, and the bottom plate together form a semi-opened space, and an edge of the top plate and the bottom plate form an opening to the space;
   a light source disposed in the space; and
   a light guide plate corresponding to the display area and extending along the bottom plate, one end of the light guide plate being located in the opening formed by the top plate and the bottom plate and corresponding to the light source, wherein a thermal isolating layer is disposed between the light guide plate and a portion of the bottom plate overlapping the display area, a perpendicular distance between the light guide plate and a portion of the bottom plate overlapping the thermal isolating layer is greater than a perpendicular distance between the light guide plate and the other portion of the bottom plate.

2. The backlight module of claim 1, further comprising a reflective sheet disposed under the light guide plate and between the light guide plate and the bottom plate, wherein the thermal isolating layer is disposed between the reflective sheet and the bottom plate.

3. The backlight module of claim 1, wherein the thermal isolating layer is formed by a layer of air.

4. The backlight module of claim 1, wherein the isolating layer is formed by a layer of thermal isolating material.

5. The backlight module of claim 1, wherein the bottom plate comprises:
   a first tier bottom plate extending from the lower end of the sidewall and partially supporting the bottom of the light guide plate; and
   a second tier bottom plate, after the first tier bottom plate is bent away from the light guide plate to form a step, the second tier bottom plate extending from one end of the first tier bottom plate along the light guide plate, wherein the second tier bottom plate at least partially overlaps the display area and the thermal isolating layer is disposed between the second tier bottom plate and the light guide plate.

6. The backlight module of claim 5, wherein the second tier bottom plate extends from the step along the light guide plate by a length of 20 mm.

7. The backlight module of claim 5, wherein the thermal isolating layer disposed between the second tier bottom plate and the light guide plate has a thickness greater than 0.3 mm.

8. The backlight module of claim 5, wherein the second tier bottom plate has a support protrusion formed thereon, the support protrusion protrudes towards the light guide plate to support the light guide plate.

9. The backlight module of claim 8, further comprising a reflective sheet disposed under the light guide plate and between the light guide plate and the second tier bottom plate, wherein the support protrusion supports the reflective sheet.

10. The backlight module of claim 8, wherein the support protrusion has a top face, the top face has a width smaller than 2 mm.

11. The backlight module of claim 1, wherein the bottom plate comprises a protrusion protruding towards the light guide plate, the protrusion contacts and supports the light guide plate.

12. The backlight module of claim 1, wherein the bottom plate comprises a protrusion protruding towards the light guide plate, the protrusion is configured to position the light source in the space.

13. A display device, comprising:
   a display panel having a display area;
   a backlight module disposed under the display panel, the backlight module comprising:
      a light source holder, comprising:
         a sidewall;
         a top plate and a bottom plate respectively extending from an upper end and a lower end of the sidewall, the bottom plate at least partially overlapping the display area, wherein the top plate, the sidewall, and the bottom plate together form a semi-opened space, and an edge of the top plate and the bottom plate form an opening to the space;
      a light source disposed in the space; and
      a light guide plate corresponding to the display area and extending along the bottom plate, one end of the light guide plate being located in the opening formed by the top plate and the bottom plate and corresponding to the light source, wherein a thermal isolating layer is disposed between the light guide plate and a portion of the bottom plate overlapping the display area, a perpendicular distance between the light guide plate and a portion of the bottom plate overlapping the thermal isolating layer is greater than a perpendicular distance between the light guide plate and the other portion of the bottom plate.

14. The display device of claim 13, further comprising a reflective sheet disposed under the light guide plate and between the light guide plate and the bottom plate, wherein the thermal isolating layer is disposed between the reflective sheet and the bottom plate.

15. The display device of claim 13, wherein the thermal isolating layer is formed by a layer of air.

16. The display device of claim 13, wherein the isolating layer is formed by a layer of thermal isolating material.

17. The display device of claim 13, wherein the bottom plate comprises:
   a first tier bottom plate extending from the lower end of the sidewall and partially supporting the bottom of the light guide plate; and
   a second tier bottom plate, after the first tier bottom plate is bent away from the light guide plate to form a step, the second tier bottom plate extending from one end of the first tier bottom plate along the light guide plate, wherein the second tier bottom plate at least partially overlaps the display area, and the thermal isolating layer is disposed between the second tier bottom plate and the light guide plate.

18. The display device of claim 17, wherein the second tier bottom plate extends from the step along the light guide plate by a length of 20 mm.

19. The display device of claim 17, wherein the thermal isolating layer disposed between the second tier bottom plate and the light guide plate has a thickness greater than 0.3 mm.

20. The display device of claim 17, wherein the second tier bottom plate comprises a support protrusion form thereon, the support protrusion protrudes towards the light guide plate to support the light guide plate.

21. The display device of claim 20, further comprising a reflective sheet disposed under the light guide plate and between the light guide plate and the second tier bottom plate, wherein the support protrusion supports the reflective sheet.

22. The display device of claim 20, wherein the support protrusion has a top face, the top face has a width smaller than 2 mm.

23. The display device of claim 13, wherein the bottom plate comprises a protrusion protruding towards the light guide plate, the protrusion contacts and supports the light guide plate.

24. The display device of claim 13, wherein the bottom plate comprises a protrusion protruding towards the light guide plate, the protrusion is configured to position the light source in the space.

* * * * *